United States Patent Office.

PIERRE JACQUES, OF PARIS, FRANCE.

Letters Patent No. 98,165, dated December 21, 1869.

IMPROVED PROCESS OF PURIFYING AND DECOLORING ALBUMEN FROM BLOOD.

The Schedule referred to in these Letters Patent and making part of the same

*To all whom it may concern:*

Be it known that I, PIERRE JACQUES, of Paris, in the Empire of France, have invented "an Improved Process for Purifying and Decoloring Blood-Albumen;" and hereby declare the following to be a true and exact description of the same.

Albumen produced from blood, and used jointly with albumen produced from eggs, is now obtained only by the action of heat.

According to the ordinary process of extraction, serum of blood is spread upon slabs, arranged in a suitable manner, and kept at a temperature of about 50°, by means of a fire.

After a whole day's desiccation, the albumen is considered to be sufficiently pure and decolored, and is sent to the market in very irregular masses. Thus prepared, blood-albumen is very far from being equal in quality to albumen produced from eggs. It is insufficiently decolored, with difficulty soluble in water, and it does not possess the amount of purity required by printers and others who use it. These disadvantages are entirely obviated by my improved process for the extraction and decoloration of blood-albumen.

I first ascertained, that in the preparatory treatment of this substance, the action of fire was insufficient, and that in order to attain a perfect decoloration, it was necessary to add to the effects of heat those of light, together with those of air and water.

It is upon this combined influence of the four physical agents, heat, light, water, and air, that the process is founded; by the aid of which, I can obtain blood-albumen, competent to replace albumen produced from eggs, whereof it possesses all the necessary qualifications.

The following are the various processes that I employ to carry out my invention.

The apparatus in which the albumen is extracted is so arranged as to facilitate the action of the different elements above mentioned.

First, the sides and top of the chamber or stove, instead of being solid and opaque, are glazed, so as to permit the access of light to the interior.

Heat is supplied, either by an open fire or a large house-stove, or, preferably, by steam-tubes, placed along the bottom of the chamber. Above are arranged pipes, by which currents of air are conveyed into the chamber, and the trays containing the serum of blood to be dried and converted into albumen are arranged in the same manner as at present.

Instead of zinc trays, however, I prefer to use enamelled trays, so that the light is conveyed a second time through the albuminous mass by reflection.

The remaining details of the process are easily understood.

Before putting the serum or the raw albumen into the trays, it is necessary to free it from grease, by mixing therewith a small quantity of spirit, such as the spirit of turpentine, in the proportion of about one per cent. The liquid mixture is by this means worked upon, and a scum formed, which must be taken off, and the trays being then charged with serum, are arranged in the stove, and the drying proceeded with, the temperature being maintained at about 40°.

At the same time that the albumen is acted upon by heat, it is also affected by the rays of light from the glass sides and top of the chamber, and only about half of the usual quantity of serum should be placed in the trays, so that the light may be able to more thoroughly penetrate it.

As soon as the albumen is observed to dry, small quantities of water are sprinkled upon it from a rose or perforated nozzle, which purifies and expands the mass. After thus soaking the albumen, currents of air are caused to act thereupon, whereby the moist particles are absorbed, and the evaporation facilitated. By these means, the desiccation and decoloring of the albumen are much more rapidly effected, from six to seven hours being sufficient for the operation, while the usual process occupies from eighteen to twenty-four hours; the result being that much time is gained, although two operations are necessary to decolor the same quantity of albumen; but the product obtained is finer and purer, and the albumen more soluble, because it is dried at a temperature of 40°, instead of 50°. It is quite as good as albumen produced from eggs, and can be advantageously used, by reason of the moderate price of its production, for all purposes to which that substance is applicable.

If a more complete decoloration is required, the product is dissolved and passed a second time through the stove, when it is watered and operated upon in the same manner as before.

To obtain colorless albumen in sheets or slabs, it suffices to redissolve it, and place the solution in greased trays, as at present.

If desired, any agent or means for aiding the purification and decoloration of vegetable and animal products, without changing their nature, such as filtration, sulphur-vapor, and others, may be adapted to this process.

Having now described the nature and particulars of my invention,

I claim the process for purifying and decoloring blood-albumen, by the combined action of the four physical agents, heat, light, water, and air, as herein described.

In testimony whereof, I have signed my name to this specification, before two subscribing witnesses.

P. JACQUES.

Witnesses:
F. OLCOTT,
C. LAFOND.